Aug. 3, 1937.  R. McLAUGHLIN  2,088,711
NONSKID TIRE ATTACHMENT
Filed June 14, 1935
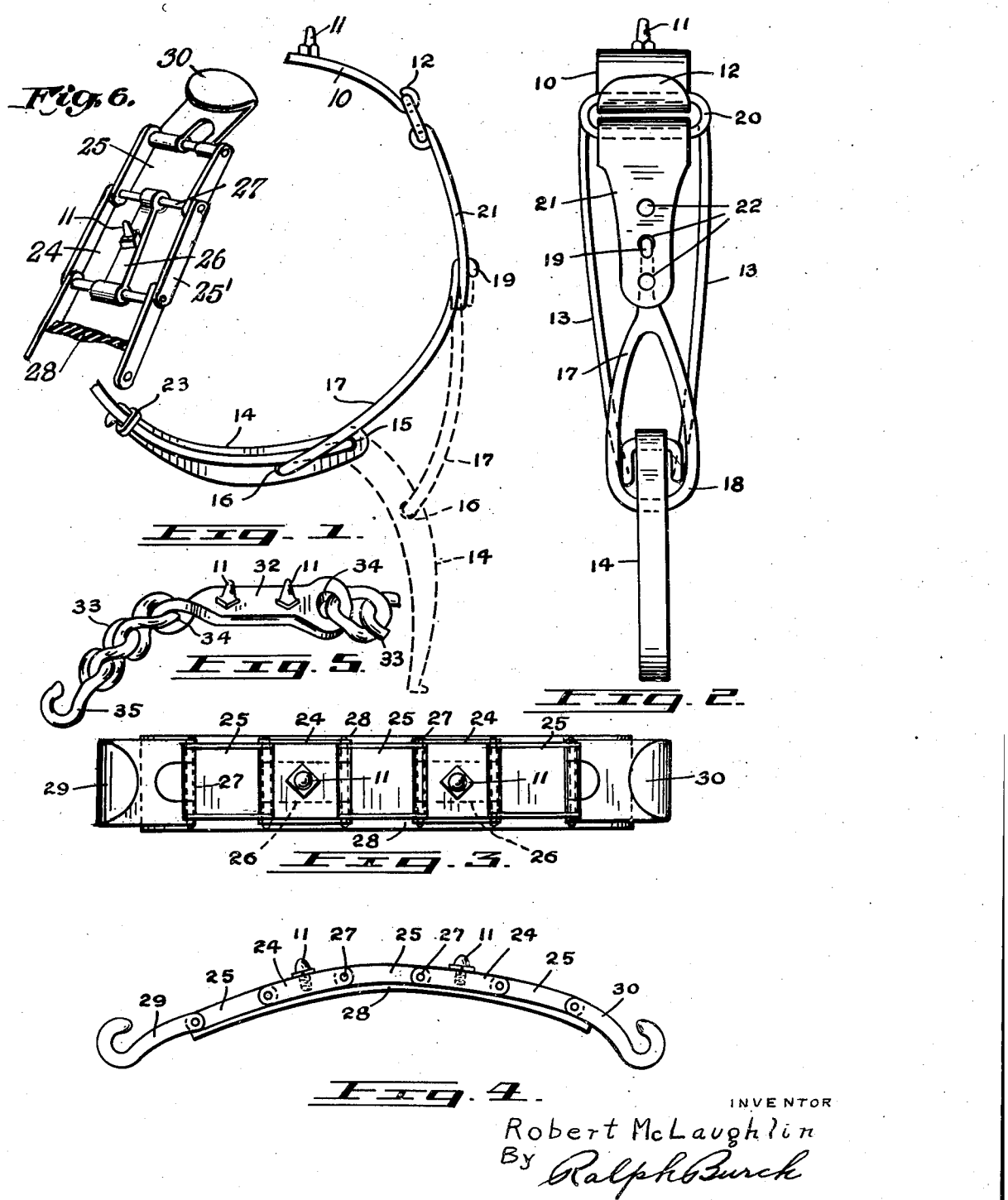
INVENTOR
Robert McLaughlin
By Ralph Burch
Attorney Patented Aug. 3, 1937

2,088,711

UNITED STATES PATENT OFFICE 2,088,711

NONSKID TIRE ATTACHMENT

Robert McLaughlin, Burk's Falls, Ontario, Canada

Application June 14, 1935, Serial No. 26,677

1 Claim. (Cl. 152—14)

This invention relates to new and useful improvements in a nonskid tire attachment. Its primary object being to devise an efficient non-skid tread member to be used on the periphery of an automobile tire, said tread member having removable or renwable studs thereon which may be replaced when worn.

A further object of the invention is to provide a nonskid tread member and means whereby the same may be readily attached or detached from the tire. In practice it has been found that existing devices of this nature are not easily fitted snugly to the tire and rim and considerable movement and rattle result. Again it has been found that the said devices are not easily removed from the tire as the leather or web straps become wet and swell or freeze which makes it very difficult to unfasten the same.

The present invention discloses an all metal construction including therein a spring lever device which assists in fitting the device snugly to the tire and rim and also obviates the possibilities of sticking and thus provides for easy attachment and removal.

Another object of the invention is to provide a tread member having a rubber composition foundation to engage the tire upon which the device is mounted and thereby reduce the wear on said tire to a minimum.

With these and other objects in view that may appear while the description proceeds the invention consists in the novel construction and arrangement of parts as hereinafter more specifically set forth claimed and shown in the accompanying drawing forming part of this specification and in which:—

Fig. 1 shows an elevation of my invention in the closed position the dotted lines showing the lever movement to the open position.

Fig. 2 is a side elevation of the same in the open position.

Fig. 3 is a plan view of a detachable cross member having a rubber composition foundation.

Fig. 4 is a side elevation of the same.

Fig. 5 is an alternate design of cross member.

Fig. 6 is a perspective view of the cross member shown in Figs. 3 and 4, with the rubber foundation broken away.

Referring more in detail to the drawing in which similar reference characters designate corresponding parts throughout the several views it will be seen the invention comprises one form of a tread member 10 having a plurality of studs 11 screwed therein. The studs are threaded so that they may be replaced or renewed as they become worn. On each end of the tread member loops 12 are formed by which the same is secured to the attaching device.

This attachment device comprises an elongated loop 13 into which the loops 12 of the cross member are connected. Said loop being curved as shown to conform to the general shape of the tire and rim. On the opposite end from the said loop 13 is a lever arm 14. Said lever arm having an orifice 15 therein by which it is pivotally secured on the said loop. The lever arm 14 is likewise curved to conform to the general shape of the device. Another orifice 16 is provided in the lever arm a predetermined distance from the end thereof and a hook member 17 secured therein. Said hook member is formed into a loop 18 which engages the said orifice 16 and is conjoined at its outer end to form the hook 19.

Secured to the other loop 12 of the tread member is a link 20 to which a strap member 21 is fastened. Said strap member 21 is likewise slightly curved and provided with a plurality of holes 22 to be engaged by the hook 19.

It will be seen from the foregoing that when the lever arm is in its outward position as shown in dotted lines of Fig. 1, the tension is released and the hook may be fastened or unfastened. By moving the said lever arm toward the rim into its closed position a leverage effect is produced whereby the device is made tight to the rim and tire. The general curved design of the various parts provides a certain spring to the device whereby the same is kept taut until released. The design of the lever arm is such that the tension of the device should keep it in its closed position but for added safety a small strong rubber band or spring loop 23 may be placed over the loop 13 and the end of the lever arm engaged thereby.

The alternate cross member shown in Figs. 3, 4 and 6 comprises a chain like structure made up of a plurality of rectangular open links 24 and 25. Each of the links includes side plates 25' having their ends overlapping the ends of the side plates of the next adjacent link which are pivotally connected together by pintle pins 27 extending transversely of the links, and mounted on the pins 27 are a series of collars 27' which maintain the side plates in spaced relation. The links 24 have a central longitudinal metal plate 26 connected with the center collars on the pins 27 into which the removable studs 11 are screwed. The entire chain structure is built into a foundation of flexible rubber 28, which fills the open spaces of the links to form a flat upper surface flush with the top surface of the links, but the studs 11 project above the top surface of the foundation. On the ends of the cross member hooks 29 and 30 are secured by means of which the member is attached to the attachment device.

In Fig. 5 is shown a tread member 32 of smaller proportions fitted with renewable studs 11. Chains 33 are provided on each end thereof and are secured thereto by means of orifices 34 in each end of the said tread member. The portion around each orifice is twisted in opposite directions to permit the chains to lie flat thereon. The chains are also of the twisted type to lie flat on the tire. On each end of the said chains is a hook member 35 to engage the attachment members 19 and 20 of the attachment device.

It is believed that the construction and advantages of the structure shown may be apparent from the foregoing paragraphs taken in conjunction with the accompanying drawing without further detailed description.

While the preferred embodiment of the invention has been disclosed it is understood that minor changes in the details of construction, combination and arrangement of cooperating parts may be resorted to within the scope of what is claimed without departing from the spirit of the invention.

I claim:—

In a nonskid tire attachment of the type described, an interchangeable tread member comprising a plurality of rectangular open links, each link being composed of opposed side plates, the ends of which are disposed in overlapping relation to the side plates of the next adjacent link, transverse pintle pins connecting said side plates together having collars thereon to maintain the opposed side plates in spaced relation, a central longitudinal metal cross bar formed in each alternate link, removable studs threaded into said cross bars and projecting above the top of the links, a flexible rubber foundation molded to fill the open spaces of said links flush with the top of the links and form a flat strip underlying the said links and projecting beyond the sides thereof, hooks pivotally connected to the end links of the tread member and extending beyond the ends of the rubber foundation and clamping means for encircling the tire detachably connected to said hooks.

ROBERT McLAUGHLIN.